United States Patent [19]

Holt

[11] Patent Number: 4,459,363

[45] Date of Patent: Jul. 10, 1984

[54] SYNTHESIS OF REFRACTORY MATERIALS

[75] Inventor: Joseph B. Holt, San Jose, Calif.

[73] Assignee: The United States of America as represented by the United States Department of Energy, Washington, D.C.

[21] Appl. No.: 523,556

[22] Filed: Aug. 16, 1983

Related U.S. Application Data

[63] Continuation-in-part of Ser. No. 470,115, Feb. 28, 1983.

[51] Int. Cl.³ .............................................. C04B 35/58
[52] U.S. Cl. ...................................... 501/96; 501/97; 501/98; 423/406
[58] Field of Search ................................... 501/96–98; 423/406

[56] References Cited

PUBLICATIONS

Newsline Weekly Bull., Lawrence Livermore Nat. Lab., vol. 7, No. 25, Jun. 30, 1982.
Borovinskaya et al., Poroshkovaya Metallurgica, No. 11 (191) pp. 42–45, 1978.
Merzhanov et al., Doklady Akademii Nauk USSP, vol. 204, No. 2, pp. 366–369, May 1972.
Holt, Industrial Research and Development, pp. 88–91, Apr., 1983.
Fedoroff et al., Encyc. of Explosives and Related Items pp. A601–A619 (Picatinny Arsenal, Dover, N.J. U.S.A., 1960.

Primary Examiner—James Poer
Attorney, Agent, or Firm—Paul Davis; Harold M. Dixon; Michael F. Esposito

[57] ABSTRACT

Refractory metal nitrides are synthesized during a self-propagating combustion process utilizing a solid source of nitrogren. For this purpose, a metal azide is employed, preferably $NaN_3$. The azide is combusted with Mg or Ca, and a metal oxide is selected from Groups III-A, IV-A, III-B, IV-B, or a rare earth metal oxide. The mixture of azide, Ca or Mg and metal oxide is heated to the mixture's ignition temperature. At that temperature the mixture is ignited and undergoes self-sustaining combustion until the starter materials are exhausted, producing the metal nitride.

11 Claims, No Drawings

SYNTHESIS OF REFRACTORY MATERIALS

The United States Government has rights in this invention pursuant to Contract No. W-7405-ENG-48 between the U.S. Department of Energy and the University of California, for the operation of Lawrence Livermore Laboratory.

This is a continuation in part of Ser. No. 470,115, filed Feb. 28, 1983, titled "Synthesis of Refractory Materials".

FIELD OF THE INVENTION

The present invention relates generally to the synthesis of refractory materials, more particularly, the invention relates to a process for synthesizing metal nitrides from the oxides of the III-A, IV-A, III-B, IV-B groups or a rare earth metal oxide.

BACKGROUND OF THE INVENTION

Refractories are those materials which can withstand very high temperatures. Although there is no well defined dividing line between refractories and non-refractories, most generally recognized refractories have softening temperatures in excess of about 1500° C. The usefulness of refractories depends upon an ability to maintain the mechanical functions at high temperatures, quite often in contact with corrosive liquids and gases. Frequently, they are employed in line furnaces and high temperature vessels. Refractories are also provided in a variety of physical forms and shapes and can be comprised of plastics, ramming mixes, gunning mixes, casting mixes, and the like. In particular, refractory nitrides are useful as crucibles for the melting of metals, and also as components of super-hard cutting tools.

In one method of refractory material synthesis, nitrides are prepared by reacting a metal with nitrogen gas. This method, however, requires high furnace temperatures for extended periods of time.

The strong exothermic heat effects of chemical reactions has been employed as a process for synthesizing nitrogen refractory materials. This combustion process, known as the self-propagating high temperature synthesis (SHS), has been utilized by numerous investigators.

Merzhanov, et al, has disclosed a process for the synthesis of refractory inorganic compounds such as carbides, nitrides, borides, sulfides, and silicides. Refractory inorganic compounds are formed utilizing the SHS process with the direct interaction of two chemical elements, one of which, the fuel (usually a metal), is in the condensed state. The other, the oxidizing agent (non-metal), is either in the condensed or in a gaseous state. The combustion process is carried out in either a constant pressure vessel or in special reactors, and initiated with an igniting device.

Borovinskaya, et al, disclosed a similar approach employing an SHS process with the production of various refractory inorganic compounds. This process is directed to the synthesis of titanium nitrides, and employs a high nitrogen pressure in the range of about 500–4500 atm. Nitrogen and titanium of various compositions which range in stoichiometry from $TiN_{0.5}$ to $TiN_{0.99}$ are obtained. In this case, high pressure equipment is required to reach full conversion.

One serious drawback of the SHS process is the low percent conversion of metal to nitride. The high adiabatic temperatures of the process, e.g., 3000°–4800° C., cause the metal to melt as the combustion fron propagates through the material. The molten metal forms an effective barrier to the inward diffusion of the nitrogen gas from outside the material.

Complete conversion is more likely to occur when high pressure $N_2$ gas is employed, e.g., 100–5000 atm. Unfortunately the high pressure equipment complicates the process and significantly reduces the advantage over conventional production methods.

It would be an advancement in the art of refractory inorganic material synthesis to provide a method for synthesizing such materials without high pressures. It would also be desirable to provide a method of synthesizing inorganic refractory materials resulting in nearly complete combustion of the starting material, and which process is energy efficient. Of particular importance would be to achieve these goals in forming refractory metal nitride from oxides of the transition metals from the groups III-A, IV-A, III-B, IV-B groups or a rare earth metal oxide.

SUMMARY OF THE INVENTION

Accordingly, an object of the invention is to provide refractory inorganic materials synthesized by a process which does not employ high pressures.

Another object of the invention is to provide a method for synthesizing refractory metal nitrides with nearly complete combustion of the metallic starting material.

Still another object of the invention is to provide a method for synthesizing refractory metal nitrides which is energy efficient.

A further object of the invention is to provide refractory metal nitrides in a process employing metallic oxides which does not employ high pressures.

Still another object of the invention is to provide refractory metal nitrides formed from metallic oxides of the III-A, IV-A, III-B, IV-B groups, and rare earth metal oxides, synthesized from a process which does not employ high pressures, and yet maximizes conversion of the oxide to the refractory nitride composition.

Additional objects, advantages, and novel features of the invention will be set forth in part in the description which follows, and will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the method of synthesizing refractory nitride compositions comprises mixing a metal azide, magnesium or calcium, with at least a stoichiometric amount of a metal oxide of the III-A, IV-A, III-B, IV-B groups, a rare earth metal oxide or a mixture thereof. The resulting mixture is ignited resulting in the formation of a refractory nitride composition.

In a further aspect of the present invention, in accordance with its objects and purposes, refractory compositions are formed by the synthesis defined in the preceding paragraph. In one embodiment of the invention, sodium azide is employed and ignited with a transition metal oxide of the III-A, IV-A, III-B, IV-B groups, or a rare earth metal oxide, along with magnesium or calcium, forming the desired refractory compositions.

The synthesis method of the present invention employs a solid source of nitrogen, and provides for the synthesis of refractory nitrides without use of high pressures. Additionally, conversion of the metal oxide to the refractory nitride composition is maximized. The process of the present invention is energy efficient, and requires much less time than processes which are currently used.

DESCRIPTION OF THE INVENTION

It has unexpectedly been discovered that refractory metal nitride compositions are formed from a combustion process utilizing a solid source of nitrogen; and the conversion of the starting metal oxide to refractory nitride is maximized. Metal oxides which are utilized in the synthesis include the metal oxides of the III-A, IV-A, III-B, IV-B groups, the rare earth metal oxides, and mixtures thereof. Preferred metal oxides are selected from the III-A, IV-A, III-B and IV-B groups. More preferably the metal oxides include $TiO_2$, $ZrO_2$, $HfO_2$, $B_2O_3$, $SiO_2$ and the like.

The source of solid nitrogen is a metal azide. Suitable metal azides are formed from the alkaline earth metals and the alkali metals, as listed in Table 1. The preferred azide is $NaN_3$.

TABLE I

| | |
|---|---|
| $NaN_3$ | $Be(N_3)_2$ |
| $KN_3$ | $Mg(N_3)_2$ |
| $LiN_3$ | $Ba(N_3)_2$ |
| $CaN_3$ | $Sr(N_3)_2$ |
| $RbN_3$ | $Br(N_3)_2$ |
| $CoN_3$ | |

Azides useful with the present invention are readily prepared from hydrozoic acid and the oxide or carbonate of the metal, or by metathesis of the metal sulfate with barium azide.

Sodium azide is readily prepared by reacting $NaNH_2$ with $N_2O$, as illustrated in the following equation:

$$2NaNH_2 + N_2O \rightarrow NaN_3 + NaOH + NH_3 \uparrow \qquad (1)$$

A complete description of this process is found in B. T. Fedoroff et al, *Encyclopedia of Explosives and Related Items,* pages A-601 to A-619 (Picatinney Arsenal, Dover, N.J., USA, 1960), incorporated herein by this reference.

Refractory nitride compositions are synthesized by mixing a metal azide, such as sodium azide, with at least a stoichiometric amount of a metal oxide selected from the III-A, IV-A, III-B, IV-B groups, rare earth metal oxides, or a mixture thereof, along with a stoichiometric amount of magnesium or calcium. The resulting mixture is ignited, and produces the desired refractory nitride composition as well as either MgO or CaO. The resulting CaO or MgO formed is then leached out with HCl in about 5 to 10 weight percent concentration.

The refractory nitride compositions of the present invention have a submicron grain size. Preferably, the grain size is about 500–1500 Å, and more preferably about 900–1100 Å.

Some of the compositions of the present invention are uniform composites which are synthesized as disclosed herein and comprise a major amount of at least one nitride selected from the III-B, IV-B, III-A, IV-A groups, or a rare earth metal nitride, and minor amounts of the metal oxide, azide, and Mg or Ca starting materials. The major amount is at least about 90%, and preferably at least 95%. The minor amount is no more than about 10%, and preferably no more than about 5%.

The metal oxide, metal azide, and calcium or magnesium are heated so that the top surface of the mixture is brought to the ignition temperature of the composition. Once this temperature is reached the process becomes self-sustaining. Suitable methods for heating or igniting the mixture include but are not limited to use of heated tungsten coils, pulsed laser beam, electric arc, focused high intensity radiation lamps, solar energy, and the like.

A nitrogen atmosphere is preferably employed during this synthesis. A nitrogen pressure of about 1 atmosphere is preferred.

The synthesis method of the present invention produces the refractory metal nitride, MgO or CaO, as well as sodium in the case where sodium azide is the starting material. The MgO and CaO are leached out by the addition of about 5 to 10 weight percent concentration HCl. Sodium vaporizes off during the combustion, yielding a substantially pure refractory nitride composition.

The following examples are illustrative of the present invention, and are not to be regarded as limiting its scope which is defined in the appended claims.

EXAMPLE 1

Synthesis of TiN with $NaN_3$

TiN is synthesized from $TiO_2$, Mg and $NaN_3$, as illustrated by the following equation:

$$3TiO_2 + 6Mg + NaN_3 \rightarrow 3TiN + 6MgO + Na \uparrow \qquad (2)$$

5.32 grams $TiO_2$, 3.24 grams Mg, and 1.44 grams $NaN_3$ are mixed by hand in a glass jar prior to placement in a quartz crucible. The crucible is placed in a glove box and pumped down to about 200 microns and then backfilled with nitrogen to a pressure of about 650 torr. The powder is ignited with a tungsten coil lightly resting on the surface of the powder. The powder ignites and burns all the way to the bottom of the crucible. Sodium is vaporized during the combustion process. 5 weight percent concentration HCl is added to the resulting product, leaching out the MgO, leaving TiN, with a grain size of about 1000 Å.

EXAMPLE 2

Synthesis of BN

BN is synthesized from starting materials $B_2O_3$, Mg and $NaN_3$, as illustrated by the following equation:

$$3B_2O_3 + 9Mg + 2NaN_3 \rightarrow 6BN + 9MgO + 2Na \uparrow \qquad (3)$$

Stoichiometric proportions of $B_2O_3$, Mg and $NaN_3$ are mixed and poured into a quartz crucible. The crucible is placed inside a glove box which is pumped out and then backfilled with nitrogen at about 1 atmosphere. A tungsten coil is included in the glove box for the purpose of igniting the sample. Power to the tungsten coil is turned to about 70 amps and upon ignition a combustion wave generated becomes self-propagating. Sodium is volatilized during the reaction and the MgO leached with the addition of about 5 weight percent HCl.

EXAMPLE 3

Synthesis of Si₃N₄

Si₃N₄ is synthesized from SiO₂, Mg and NaN₃, as illustrated by the following equation:

$$3SiO_2 + 6Mg + 1.33NaN_3 \rightarrow Si_3N_4 + 6MgO + 1.33Na\uparrow \quad (4)$$

Stoichiometric proportions of the three starting materials are mixed and poured into a quartz crucible. The crucible is placed in a glove box which is pumped and then backfilled with nitrogen at about 1 atmosphere. A pulsed laser beam supplies sufficient energy to the mixture to heat it to its ignition temperature. Upon ignition, a combustion wave self propagates throughout the crucible, resulting in about 100% conversion of the starting materials to the products. During the process, sodium is volatilized and the MgO removed during a subsequent leaching process with the addition of dilute HCl.

EXAMPLE 4

Synthesis of ZrN

ZrN is synthesized from ZrO₂, NaN₃ and Ca, as illustrated by the following equation:

$$3ZrO_2 + 6Ca + NaN_3 \rightarrow 3ZrN + 6MgO + Na\uparrow \quad (5)$$

A composition comprising stoichiometric amounts of ZrO₂, NaN₃ and Ca is mixed and poured into a quartz crucible. The crucible is placed in a glove box maintained under a nitrogen atmosphere. The glove box is pumped down and nitrogen is reintroduced. A nitrogen atmosphere of 1 atmosphere is provided. A tungsten coil is included for igniting the mixture. Power to the coil is turned up to about 70 amps and heats the mixture until its ignition temperature is reached. Thereafter, power is turned off while the mixture combusts in a self-propagating manner. Sodium is vaporized during the process, and the resulting CaO which is formed is later leached from the ZrN by the addition of 5 weight percent HCl.

EXAMPLE 5

Synthesis of HfN

HfN is synthesized from HfO₂, NaN₃ and Ca, as illustrated by the following equation:

$$3HfO_2 + 6Ca + NaN_3 \rightarrow 3HfN + 6CaO + Na\uparrow \quad (6)$$

Stoichiometric proportions of HfO₂, NaN₃ and Ca are mixed and then poured into a quartz crucible which is then placed inside a glove box. A nitrogen atmosphere is introduced (1 atmosphere) and the mixture heated to its ignition temperature by a pulsed laser beam. When the mixture ignites, power to the laser is discontinued and the combustion reaction self-propagates until HfN is formed. The sodium is volatilized during the process. CaO is leached from the HfN with the addition of 5 weight percent HCl.

EXAMPLE 6

Synthesis of YN

YN is synthesized from Y₂O₃, Mg and NaN₃, as illustrated by the following equation:

$$3Y_2O_3 + 9Mg + 2NaN_3 \rightarrow 6YN + 9MgO + 2Na\uparrow \quad (6)$$

Stoichiometric proportions of Y₂O₃, Mg and NaN₃ are mixed and then poured into a quartz crucible which is then placed inside a glove box. A nitrogen atmosphere is introduced (~1 atmosphere) and the mixture heated to its ignition temperature by a tungsten coil. When the mixture ignites, power to the coil is discontinued and the combustion process self propagates until YN is formed. The sodium is vaporized during the combustion and MgO leached out by the addition of 5 weight percent HCl.

EXAMPLE 7

Synthesis of TiN, HfN Mixture

A mixture of TiN and HfN is synthesized from TiO₂, HfO₂, Mg and NaN₃, as illustrated by the following equation:

$$3/2TiO_2 + 3/2HfO_2 + 6Mg + NaN_3 \rightarrow 3/2TiN + 3/2HfN + 6MgO + Na\uparrow \quad (8)$$

Stoichiometric proportions of TiO₂, HfO₂, Mg and NaN₃ are mixed and then poured into a quartz crucible which is then placed inside a glove box. A nitrogen atmosphere of about 1 atm is introduced and the mixture heated to its ignition temperature by a tungsten coil. When the mixture ignites, power to the coil is discontinued and the combustion process self-propagates until a mixture of TiN and HfN forms. Sodium is vaporized during the combustion process and MgO leached out by the addition of 5 weight percent HCl.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application, to thereby enable others skilled in the art to best utilize the invention in various embodiments and with various modifications as are suited to the particular use comtemplated. It is intended that the scope of the invention be defined by the claims appended hereto.

I claim:

1. A method of synthesizing refractory nitride compositions, comprising:
    (a) mixing a metal azide with Ca or Mg and at least a stoichiometric amount of a metal oxide selected from the group consisting of the rare earth metals, the metals of the III-A, IV-A, III-B, IV-B groups, or a mixture thereof;
    (b) heating the resulting mixture of step (a) until a mixture ignition temperature is attained; and
    (c) allowing the mixture from step (b) to combust in a self-propagating manner to form a refractory nitride composition.

2. The method according to claim 1, wherein said ignition of step (b) is carried out in a nitrogen atmosphere.

3. The method according to claim 1, further comprising adding a solution of about 5 to 10 weight percent HCl to said nitride composition formed in step (c).

4. The method according to claim 1, wherein said metal azide is an alkaline earth or alkaline metal azide.

5. The method according to claim 1, wherein said azide is NaN₃.

6. The method according to claim 1, wherein said azide and metal oxide are reacted with Mg.

7. The method according to claim 6, wherein said azide is $NaN_3$ and said metal oxide is $B_2O_3$.

8. The method according to claim 6, wherein said azide is $NaN_3$ and said metal oxide is $SiO_2$.

9. The method according to claim 6, wherein said azide is $NaN_3$ and said metal oxide is $TiO_2$.

10. The method according to claim 6, wherein said azide is $NaN_3$ and said metal oxide is $ZrO_2$.

11. The method according to claim 6, wherein said azide is $NaN_3$ and said metal oxide is $HfO_2$.

* * * * *